(12) United States Patent
Casal Martin et al.

(10) Patent No.: US 11,924,522 B2
(45) Date of Patent: Mar. 5, 2024

(54) MULTIMEDIA CONTENT DELIVERY WITH REDUCED DELAY

(71) Applicants: Juan Casal Martin, Madrid (ES); Jorge Ruano Puente, Madrid (ES)

(72) Inventors: Juan Casal Martin, Madrid (ES); Jorge Ruano Puente, Madrid (ES)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/883,452

(22) Filed: Jan. 30, 2018

(65) Prior Publication Data
US 2018/0310075 A1  Oct. 25, 2018

(30) Foreign Application Priority Data
Apr. 21, 2017 (EP) .................................... 17382215

(51) Int. Cl.
*H04N 21/647* (2011.01)
*H04L 29/06* (2006.01)
(Continued)

(52) U.S. Cl.
CPC ....... *H04N 21/64776* (2013.01); *H04L 65/60* (2013.01); *H04L 65/80* (2013.01);
(Continued)

(58) Field of Classification Search
CPC ......... H04N 21/64776; H04N 21/2187; H04N 21/23406
(Continued)

(56) References Cited

U.S. PATENT DOCUMENTS 8,064,389 B2 * 11/2011 Khan .................... H04B 7/2123
375/240
8,072,943 B2 * 12/2011 Khan .................... H04L 1/0625
370/335
(Continued)

FOREIGN PATENT DOCUMENTS

CN 102577272 A 7/2012
CN 104506868 A 4/2015
(Continued)

OTHER PUBLICATIONS

European Search Report dated Jan. 10, 2018 in European Application No. 17382215.6.
(Continued)

*Primary Examiner* — Michael B. Pierorazio
(74) *Attorney, Agent, or Firm* — Harness, Dickey & Pierce, P.L.C.

(57) ABSTRACT

A content delivery server is configured to receive a request for a chunk of a segment of a video stream, the segment of the video stream including a series of chunks, each of the chunks including a set of video frames, a first of the chunks being aligned with a first Instantaneous Decoder Refresh frame in the video stream, and a second of the chunks being aligned with a second subsequent Instantaneous Decoder Refresh frame in the video stream; determine whether the request was received during a first interval or a second subsequent interval of an intra period between the first of the chunks and the second of the chunks; and output the first of the chunks or the second of the chunks for transmission based on the determination of whether the request was received during the first interval or the second interval.

3 Claims, 9 Drawing Sheets

(51) Int. Cl.
  *H04L 65/60* (2022.01)
  *H04L 65/80* (2022.01)
  *H04N 21/2187* (2011.01)
  *H04N 21/234* (2011.01)
  *H04N 21/2343* (2011.01)
  *H04N 21/239* (2011.01)
  *H04N 21/242* (2011.01)
  *H04N 21/262* (2011.01)
  *H04N 21/6373* (2011.01)
  *H04N 21/643* (2011.01)
  *H04N 21/845* (2011.01)

(52) U.S. Cl.
  CPC ... *H04N 21/2187* (2013.01); *H04N 21/23406* (2013.01); *H04N 21/23418* (2013.01); *H04N 21/234309* (2013.01); *H04N 21/23439* (2013.01); *H04N 21/2393* (2013.01); *H04N 21/242* (2013.01); *H04N 21/26258* (2013.01); *H04N 21/6373* (2013.01); *H04N 21/643* (2013.01); *H04N 21/8456* (2013.01)

(58) Field of Classification Search
  USPC .......................................................... 725/93
  See application file for complete search history.

(56) References Cited

U.S. PATENT DOCUMENTS

| | | | |
|---|---|---|---|
| 8,621,508 B2 | 12/2013 | Rowe et al. | |
| 8,730,985 B2 | 5/2014 | Staniec et al. | |
| 8,763,029 B1 | 6/2014 | Haberman et al. | |
| 8,824,304 B2* | 9/2014 | Vulkan | H04L 65/80 370/252 |
| 8,855,189 B1 | 10/2014 | Krause et al. | |
| 9,743,156 B1 | 8/2017 | McLean et al. | |
| 10,356,449 B2* | 7/2019 | Moon | H04H 60/07 |
| 10,499,278 B2* | 12/2019 | Anchan | H04L 69/24 |
| 2004/0034863 A1* | 2/2004 | Barrett | H04L 1/1685 725/38 |
| 2005/0190794 A1 | 9/2005 | Krause et al. | |
| 2005/0251843 A1 | 11/2005 | Walker | |
| 2007/0165104 A1* | 7/2007 | Khan | H04H 20/30 348/14.02 |
| 2007/0165566 A1* | 7/2007 | Khan | H04B 7/022 370/329 |
| 2008/0170630 A1* | 7/2008 | Falik | H04L 47/26 375/E7.193 |
| 2009/0022218 A1* | 1/2009 | Kim | H04N 19/70 375/240.03 |
| 2009/0022221 A1* | 1/2009 | Xie | H04N 19/187 375/E7.03 |
| 2009/0074082 A1* | 3/2009 | Xiong | H04N 19/61 375/E7.2 |
| 2009/0083279 A1* | 3/2009 | Hasek | H04L 67/2823 |
| 2009/0168680 A1* | 7/2009 | Singh | H04L 12/189 370/312 |
| 2009/0187939 A1 | 7/2009 | Lajoie | |
| 2009/0290848 A1* | 11/2009 | Brown | H04N 5/232 386/223 |
| 2009/0295905 A1* | 12/2009 | Civanlar | H04L 45/22 348/14.09 |
| 2010/0054343 A1 | 3/2010 | Ohnishi et al. | |
| 2010/0106805 A1 | 4/2010 | Sands, IV et al. | |
| 2010/0118760 A1* | 5/2010 | Xie | H04N 21/2368 370/312 |
| 2010/0172278 A1* | 7/2010 | Nishio | H04W 52/42 370/312 |
| 2010/0172286 A1* | 7/2010 | Yoshii | H04J 11/005 370/328 |
| 2010/0299715 A1 | 11/2010 | Slothouber et al. | |
| 2010/0325658 A1 | 12/2010 | Schlack et al. | |
| 2011/0015989 A1 | 1/2011 | Tidwell et al. | |
| 2011/0016479 A1 | 1/2011 | Tidwell et al. | |
| 2011/0080940 A1 | 4/2011 | Bocharov et al. | |
| 2011/0138414 A1 | 6/2011 | Koren et al. | |
| 2011/0302600 A1 | 12/2011 | Kelsen et al. | |
| 2012/0114302 A1* | 5/2012 | Randall | G11B 27/105 386/241 |
| 2012/0198501 A1* | 8/2012 | Ruan | H04H 20/30 725/62 |
| 2013/0091251 A1* | 4/2013 | Walker | H04N 21/23424 709/219 |
| 2013/0132507 A1* | 5/2013 | Swaminathan | H04N 21/8456 709/217 |
| 2013/0230040 A1* | 9/2013 | Adachi | H04W 52/0209 370/349 |
| 2014/0020013 A1 | 1/2014 | DiLorenzo | |
| 2014/0143388 A1 | 5/2014 | Biderman et al. | |
| 2014/0143439 A1 | 5/2014 | Ramamurthy | |
| 2014/0267898 A1* | 9/2014 | Raviv | H04N 21/2407 348/390.1 |
| 2014/0282777 A1 | 9/2014 | Gonder et al. | |
| 2015/0039389 A1 | 2/2015 | Besehanic et al. | |
| 2015/0201012 A1* | 7/2015 | Shaffer | H04L 67/62 709/231 |
| 2015/0256902 A1 | 9/2015 | Fusco et al. | |
| 2015/0281746 A1* | 10/2015 | Lam | H04N 21/231 725/116 |
| 2015/0281752 A1* | 10/2015 | Van Veldhuisen | H04N 21/233 725/116 |
| 2015/0373383 A1* | 12/2015 | Pichumani | H04N 21/4825 725/90 |
| 2016/0029051 A1 | 1/2016 | Manzari et al. | |
| 2016/0119657 A1 | 4/2016 | Sun | |
| 2016/0277475 A1* | 9/2016 | Lee | H04L 65/80 |
| 2016/0286252 A1 | 9/2016 | Coudurier et al. | |
| 2017/0048562 A1 | 2/2017 | Edson et al. | |
| 2017/0070565 A1 | 3/2017 | Toya et al. | |
| 2017/0093939 A1 | 3/2017 | Bar-Mashiah et al. | |
| 2017/0111416 A1 | 4/2017 | Lester et al. | |
| 2017/0111670 A1 | 4/2017 | Ducloux et al. | |
| 2017/0353518 A1* | 12/2017 | McLeod | H04L 65/4084 |
| 2017/0359607 A1* | 12/2017 | Li | H04N 21/4331 |
| 2018/0176637 A1 | 6/2018 | Cho et al. | |
| 2018/0255331 A1 | 9/2018 | McLean et al. | |
| 2020/0037014 A1 | 1/2020 | Dahl et al. | |
| 2020/0322691 A1* | 10/2020 | Hui | H04N 21/6373 |

FOREIGN PATENT DOCUMENTS

| | | |
|---|---|---|
| CN | 105144727 A | 12/2015 |
| CN | 106210884 A | 12/2016 |
| EP | 3107261 | 12/2016 |
| WO | WO-2015/162376 | 10/2015 |

OTHER PUBLICATIONS

Brendan Long, "Proposed study text for 23009-3 for low latency", MPEG Meeting, Geneva, No. m37491, Oct. 22. 2015.

Wendell Sun, "Sever Centric Push for Live and Linear Program in MPEG DASH", Arris International, 116. MPEG Meeting, Chengdu, China, No. m38974, Oct. 8, 2016.

Jean Le Feuvre et al., "On Dash Low Latency CE", Telecom Paris Tech, MPEG Meeting, Vienna, Austria, No. m30296, Jul. 24, 2013.

European Communication dated Apr. 12, 2019 in European Application No. 17382215.6.

Office Action dated Jul. 1, 2020 in Chinese Application No. 201810354584.

Bouzakaria, N. et al., "Overhead and Performance of Low Latency Live Streaming using MPEG Dash," IEEE, 2014.

U.S. Non-Final Office Action issued in U.S. Appl. No. 17/870,233, dated Aug. 1, 2023.

* cited by examiner

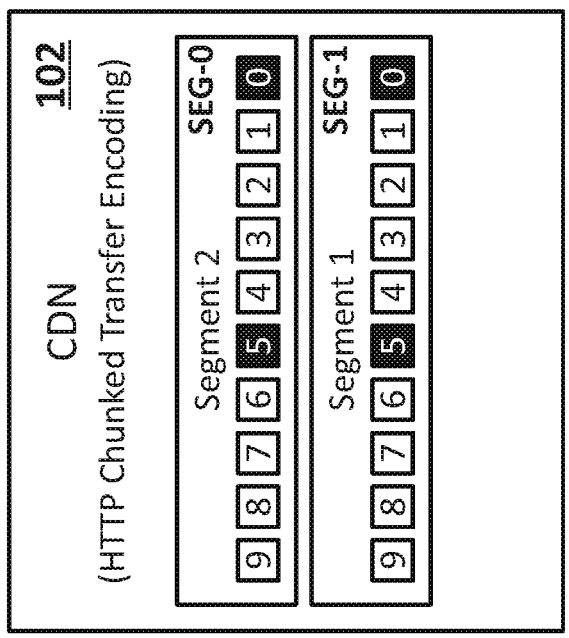
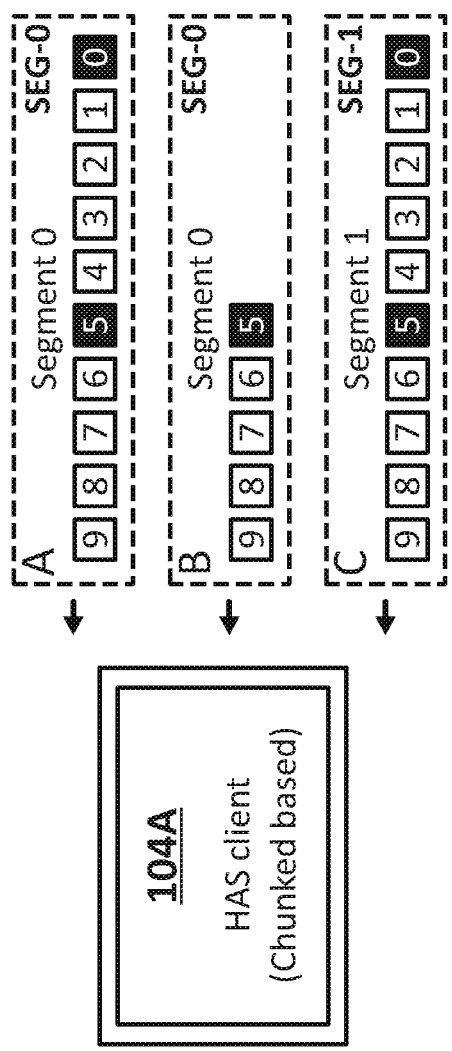
FIG. 2

MULTIMEDIA CONTENT DELIVERY WITH REDUCED DELAY

CROSS-REFERENCE TO RELATED APPLICATIONS

The present application claims priority under 35 U.S.C. § 119 to European Patent Application No. 17382215.6, filed on Apr. 21, 2017, in the European Patent Office, the entire contents of which are hereby incorporated by reference.

BACKGROUND

Field

One or more example embodiments relate to methods, devices and/or computer-readable mediums for multimedia content delivery with reduced delay.

Discussion of Related Art

In conventional InternetTV distribution systems, there may be relatively significant delay between an input signal (e.g., a multicast stream, such as a video stream in MPEG-2 transport stream format), and the stream that arrives at the end user. This delay may be longer (e.g., tenths of seconds longer) than other television (TV) distribution methods, such as cable. As a result, user experience of InternetTV distribution systems may be relatively poor when compared to other TV distribution systems, especially with regard to live events.

SUMMARY

One or more example embodiments provide methods, apparatuses and/or computer-readable mediums for delivering multimedia content to end users with reduced delay.

At least one example embodiment provides a content delivery server comprising: a memory storing computer-readable instructions; and one or more processors coupled to the memory. The one or more processors are configured to execute the computer-readable instructions to: receive a request for a chunk of a segment of a video stream, the segment of the video stream including a series of chunks, each of the chunks including a set of video frames, a first of the chunks being aligned with a first Instantaneous Decoder Refresh frame in the video stream, and a second of the chunks being aligned with a second Instantaneous Decoder Refresh frame in the video stream, the second Instantaneous Decoder Refresh frame being subsequent to the first Instantaneous Decoder Refresh frame in the video stream; determine whether the request was received during a first interval or a second interval of an intra period between the first of the chunks and the second of the chunks, the first interval prior to the second interval in the intra period; and output the first of the chunks or the second of the chunks for transmission based on the determination of whether the request was received during the first interval or the second interval.

At least one other example embodiment provides a content delivery server, comprising: a memory storing computer-readable instructions; and one or more processors coupled to the memory. The one or more processors are configured to execute the computer-readable instructions to: receive a request for a chunk of a segment of a video stream, the segment of the video stream including a series of chunks, each of the chunks including a set of video frames, a first of the chunks being aligned with a first Instantaneous Decoder Refresh frame in the video stream, and a second of the chunks being aligned with a second Instantaneous Decoder Refresh frame in the video stream, the second Instantaneous Decoder Refresh frame being subsequent to the first Instantaneous Decoder Refresh frame in the video stream; determine whether the request was received during an intra period between the first of the chunks and the second of the chunks; and output the second of the chunks or a third chunk of a subsequent segment of the video stream for transmission based on the determination of whether the request was received during the intra period, the third chunk being aligned with a third Instantaneous Decoder Refresh frame in the video stream.

At least one other example embodiment provides a content delivery server configured to provide video content to a client, the content delivery server comprising: a memory storing computer-readable instructions; and one or more processors coupled to the memory. The one or more processors are configured to execute the computer-readable instructions to: receive a request for a segment of a video stream, the segment of the video stream including a series of chunks, each of the chunks including a set of video frames, a first of the chunks being aligned with a first Instantaneous Decoder Refresh frame in the video stream, and a second of the chunks being aligned with a second Instantaneous Decoder Refresh frame in the video stream, the second Instantaneous Decoder Refresh frame being subsequent to the first Instantaneous Decoder Refresh frame in the video stream; output the first of the chunks in response to the request; determine whether a playback delay at the client exceeds a delay threshold based on a chunk production flow at the content delivery server; and output one of a next chunk in the series of chunks or the second of the chunks for transmission to the client based on whether the playback delay exceeds the delay threshold.

At least one other example embodiment provides a content delivery server configured to provide video content to a client, the content delivery server comprising: a memory storing computer-readable instructions; and one or more processors coupled to the memory. The one or more processors are configured to execute the computer-readable instructions to: receive a request for a segment of a video stream, the segment of the video stream including a series of chunks, each of the chunks including a set of frames of the video stream; determine that a next available chunk in the series of chunks is not aligned with an Instantaneous Decoder Refresh frame in the video stream; transcode the next available chunk to include an Instantaneous Decoder Refresh frame in the video stream; identify the transcoded chunk as a random access point in the video stream; and output the transcoded chunk for transmission.

At least one other example embodiment provides a server comprising: a memory storing computer-readable instructions; and one or more processors coupled to the memory. The one or more processors are configured to execute the computer-readable instructions to: create a first playlist informing at least a first client of at least a first portion of a video stream available for distribution to the first client, the first playlist exposing segments of the video stream completed and stored at the server; and create a second playlist informing at least a second client of a second portion of the video stream available for distribution to the second client, the second playlist exposing a current, uncompleted segment of the video stream.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

FIG. 2 is a block diagram illustrating a portion of the system for delivering multimedia content shown in FIG. 1.

Figure 1:
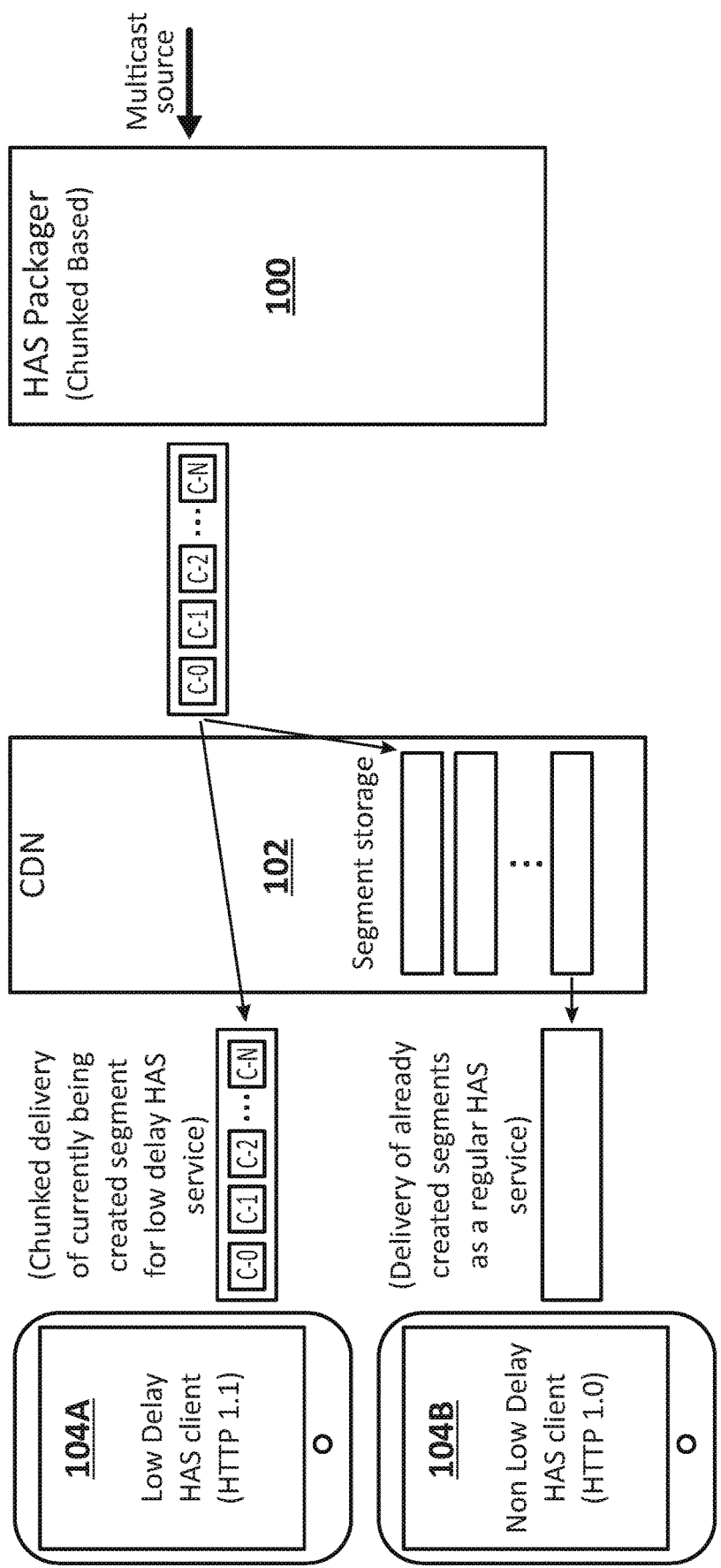
FIG. 1 is a block diagram illustrating an example embodiment of a system for delivering multimedia content to end users.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be rioted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing clients, nodes, controllers, computers, cloud-based servers, web servers, Hyper-Text-Transfer-Protocol (HTTP) servers, application servers, or the like. As discussed later, such existing hardware may include, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, clients, nodes, controllers, computers, cloud-based servers, web servers, Hyper-Text-Transfer-Protocol (HTTP) servers, application servers, or the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

The clients, nodes, controllers, computers, cloud-based servers, web servers, Hyper-Text-Transfer-Protocol (HTTP) servers, application servers, or the like, may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more elements, such as clients, nodes, controllers, computers, cloud-based servers, web servers, Hyper-Text-Transfer-Protocol (HTTP) servers, application servers, or the like.

FIG. 1 is a block diagram illustrating an example embodiment of a system for delivering multimedia content to end users.

Herein, the system shown in FIG. 1 will be discussed with regard to a system configured to deliver multimedia (e.g., video and/or audio) content to end users using HTTP Adaptive Streaming (HAS). In some instances, the content may be referred to as video content. However, it should be understood that video content may include video and audio.

As is known, HAS is an approach to streaming video-on-demand and real-time content. With regard to video-on-demand, for example, HAS is adaptive in the sense that the video quality can be adjusted based on the bandwidth or data rate available between a content delivery network (CDN) and a respective HAS client. However, each HAS client individually adapts its video quality independent of other HAS clients sharing the same resources. Example implementations of HAS include MPEG Dynamic Streaming of HTTP (MPEG-DASH), HTTP Dynamic Streaming, HTTP Live Streaming (HLS), and HTTP Smooth Streaming.

Delivery of multimedia content via HAS may be performed by segmenting multimedia content (e.g., audio and/or video) into HAS segments and/or using Chunked Transfer Encoding (CTE).

In this context, a HAS segment is a portion of streaming multimedia content or data divided for delivery according to a HAS protocol, such as MPEG-DASH, HTTP Dynamic Streaming, HLS, HTTP Smooth Streaming, or the like.

As is known, CTE is a data transfer mechanism in the Hypertext Transfer Protocol (HTTP), version 1.1 and up. In CTE, the content (or data) is sent as a series (or sequence) of "chunks." A chunk refers to a portion of a video segment (e.g., including a number of video frames, such as I, P and/or B frames, of a video stream). For video coding formats using temporal prediction (e.g., MPEG1, MPEG2, AVC, HEVC, VP8, VP9, AV1, etc.), video streams also include Instantaneous Decoder Refresh (IDR) frames (or pictures), which may be decoded without reference to previous frames. A period between IDR frames in a video stream (and/or IDR chunks in a segment) may be referred to as an intra period (or intra interval). In one example, an intra period may be less than or equal to about 2 seconds. When using CTE with High Intra Profile video coding, a chunk aligned with the beginning of an IDR frame in a video stream (e.g., the IDR frame is the first frame in the chunk) is referred to as an IDR chunk.

Referring to FIG. 1, the system includes a HAS packager 100 in communication with a CDN 102. The system further includes HAS clients 104A and 104B in communication with the CDN 102. Although shown as separate elements, the HAS packager 100 and the CDN 102 may be co-located with one another (e.g., at one or more web servers).

As is known, a HAS client is an application (or application layer module) operating on an electronic device, such as a smartphone, tablet, laptop computer, or the like. As discussed herein, HAS client 104A is a client capable of receiving multimedia content via chunk-based delivery, and is sometimes referred to herein as a "low delay HAS client" or a "chunk-based HAS client." The HAS client 104B is a conventional HAS client, sometimes referred to herein as a "non-low delay HAS client" or a "non-chunk-based HAS client," which is capable of receiving multimedia content via conventional delivery of HAS segments. Although only two HAS clients are shown in FIG. 1, it should be understood that any number of HAS clients may be served by the system shown in FIG. 1.

The HAS packager 100 may be implemented by way of, for example, a web server. According to one or more example embodiments, the HAS packager 100 segments a continuous stream of multimedia media content received from a multicast source (e.g., a video or other multimedia content server) into relatively small chunks C-0, C-1, C-2, . . . C-N in real-time, which are then output to the CDN 102. Unlike the conventional art, the HAS packager 100 need not wait for receipt of an entire HAS segment before outputting the received content to the CDN 102, rather the chunks may be output to the CDN 102 as they are created.

According to one or more example embodiments, the HAS packager 100 may improve and/or optimize the process of packaging multimedia content for relatively low delay HAS delivery, while maintaining backward compatibility with regular HAS video clients. In one example, the HAS packager 100 may segment the received content into chunks, each of which includes about 4 frames (or pictures), rather than about 25 or 50 frames as is the case with conventional HAS segments. Because the HAS packager 100 need not wait for receipt of an entire HAS segment of content before outputting the content to the CDN 102, the delay experienced by the end-user in response to a request for the content may be reduced.

Still referring to FIG. 1, the CDN 102 may be an HTTP server or a distributed network of proxy servers deployed in multiple data centers), which is (are) configured to serve multimedia (e.g., audio and/or video) content to end users with relatively high availability and/or relatively high performance. In some instances, the CDN 102 may be described as a HTTP server. However, example embodiments should not be limited to this example. The CDN 102 may also be referred to as a content delivery server.

In the example embodiment shown in FIG. 1, upon receiving a request for multimedia content (e.g., a chunk or chunks) from the HAS client 104A, the CDN 102 delivers/sends chunks of multimedia content (received from the HAS packager 100) to the HAS client 104A independent of whether a complete HAS segment has been received from the HAS packager 100.

The CDN 102 informs HAS clients of available multimedia content via a playlist (or manifest). As is known, playlist or manifest is a file or files sent from the CDN 102 to HAS clients to expose the multimedia content available at the CDN 102.

According to one or more example embodiments, the CDN 102 creates a chunk-based specific HAS playlist for providing low delay HAS service to low delay HAS clients (e.g., HAS client 104A). The chunk-based specific HAS playlist exposes HAS segments that have not been completely created (e.g., only first chunks are available) by the HAS packager 100. In a more specific example, the chunk-based specific HAS playlist exposes only the segment that is currently being fragmented (or created) by the HAS packager 100. Upon receiving this chunk-based specific HAS playlist, the low delay HAS client 104A may request a chunk or chunks of multimedia content while a HAS segment and/or chunk or chunks of a HAS segment are being created by the HAS packager 100, and thus, receive the requested multimedia content as soon as available. In smaller systems, the HAS packager 100 may create a chunk-based specific HAS playlist, and pass the playlist to the CDN 102 for sending to the HAS client.

Still referring to FIG. 1, the CDN 102 also groups and stores the chunks from the HAS packager 100 as conventional HAS segments. By grouping and storing these conventional HAS segments, the CDN 102 is also able to create and provide a regular (conventional) HAS playlist to non-low delay HAS clients (e.g., HAS client 104B) to expose at least some of the most recent HAS segments created and stored at the CDN 102, thereby preserving backward compatibility (e.g., with HTTP1.0 clients).

Upon receiving the requested content, a given HAS client (e.g., 104A and/or 104B) may provide playback to the end user.

According to one or more example embodiments, a CDN may manage and/or balance playback delay and playback start time delay in LiveTV HAS transmission to, for example, improve InternetTV User Experience. According to at least one example embodiment, an initial (first) request for video content from a chunk-based HAS client is served based on the time of the request and according to both playback delay and video delay.

Figure 5A:
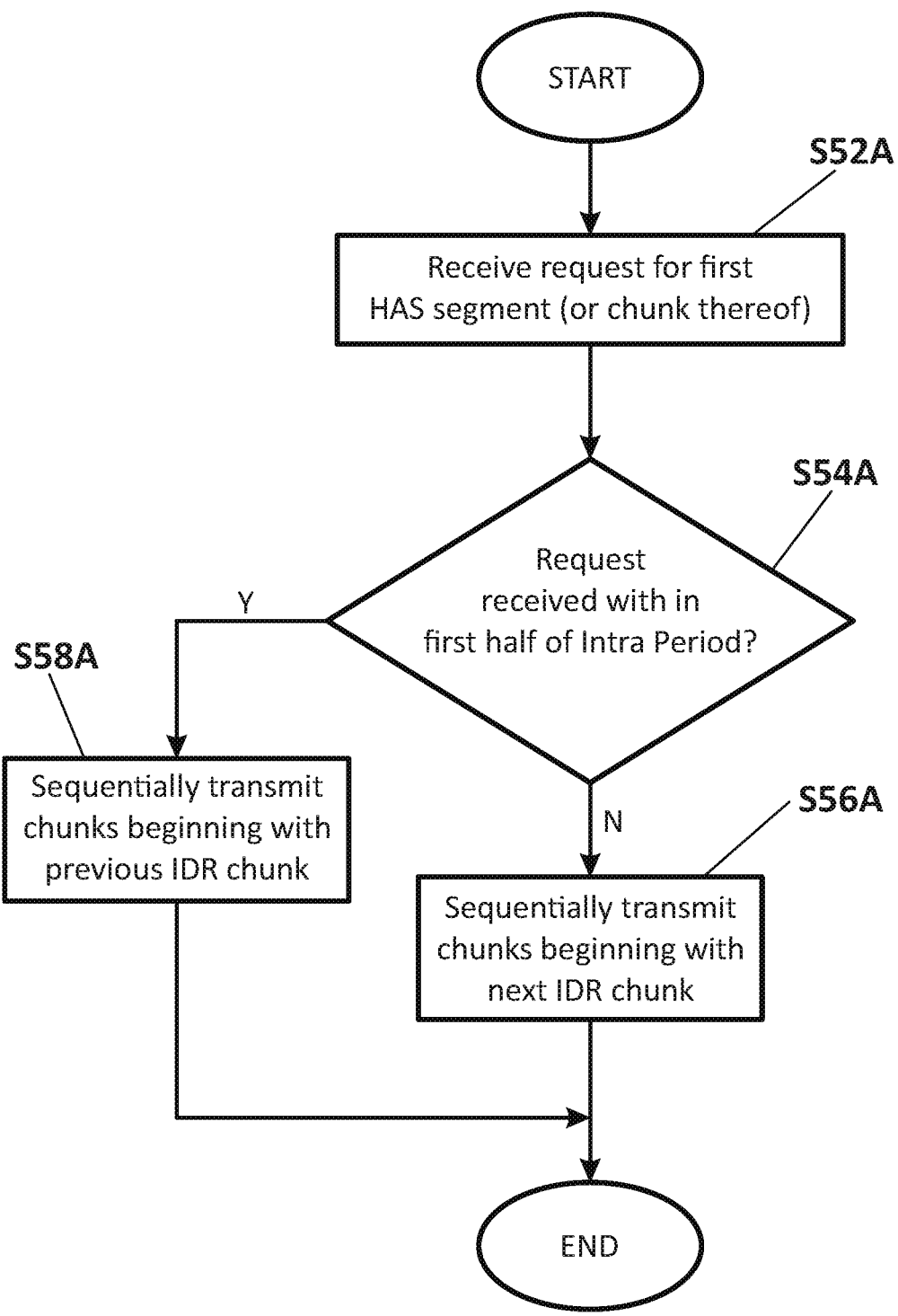
FIG. 5A is a flow chart illustrating an example embodiment of a method for delivering multimedia content to end users.
Figure 5B:
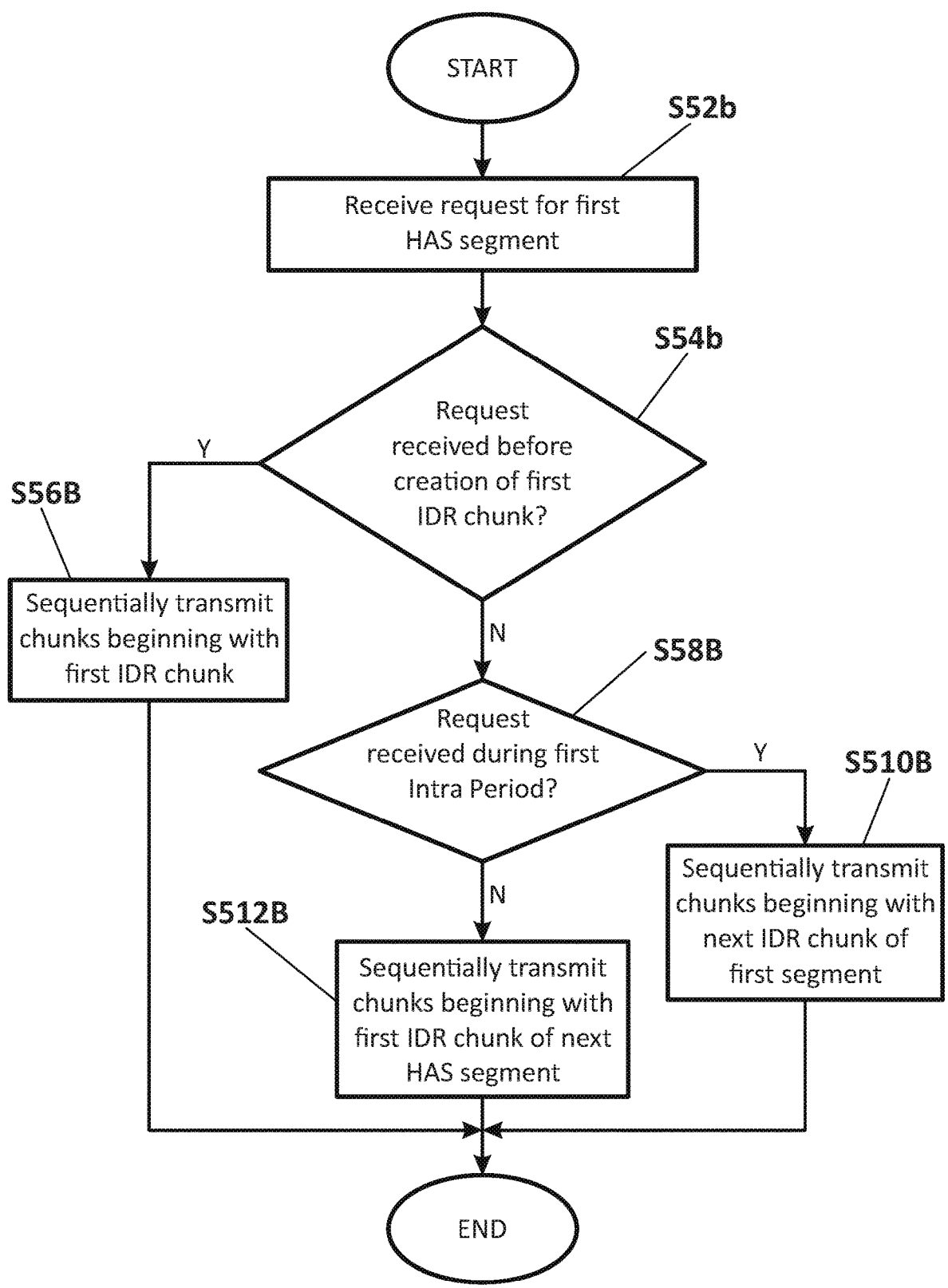
FIG. 5B is a flow chart illustrating another example embodiment of a method for delivering multimedia content to end users.

FIGS. 5A and 5B illustrate example embodiments of methods for delivering multimedia content to end users. FIG. 2 is a block diagram illustrating a portion of the system for delivering multimedia content shown in FIG. 1, for describing the example embodiments shown in FIGS. 5A and 5B.

As shown in FIG. 2, the portion of the system includes the CDN 102 and HAS client 104A. For example purposes, the example embodiments shown in FIGS. 2, 5A, and 5B will be discussed with regard to a first HAS segment SEG-0 and a second HAS segment SEG-1 of video content to be provided to the HAS client 104A in response to receiving a request for (e.g., a chunk of) the video content from the HAS client 104A during creation of the first HAS segment SEG_0 of video content. In the example shown in FIG. 2, the HAS segments SEG-0 and SEG-1 are each divided into a series of 10 chunks 0-9 that are sequentially created in real time. Of the 10 chunks in each HAS segment SEG-0 and SEG-1, chunks 0 and 5 are IDR chunks. Although discussed with regard to this specific example, example embodiments should not be limited thereto.

Referring to FIGS. 2 and 5A, at step S52A the CDN 102 receives an initial request (from the HAS client 104A) for chunk 0 of the first HAS segment SEG-0 during creation of the first HAS segment SEG_0 at the HAS packager 100.

In response to receiving the request from the HAS client 104A, at step S54A the CDN 102 determines whether the request has been received during a first half of the intra period between the first IDR chunk 0 and the second IDR chunk 5 of the first HAS segment SEG-0. With regard to the example shown in FIG. 2, the CDN 102 may determine that the request for chunk 0 has been received during the first half of the first intra period between the first IDR chunk 0 and the second IDR chunk 5 of the first HAS segment SEG-0 if the request is received prior to creation of chunk 3 of the first HAS segment SEG-0.

According to one or more example embodiments, the CDN 102 may have an application programming interface (API) for ingestion of content. Once the HAS packager 100 uses the API to ingest a multimedia stream, the CDN 102 is aware of the creation of the chunks, and thus, can determine when a chunk is received relative to creation of a particular chunk.

Still referring to FIG. 5A, if the CDN 102 determines that the request is received within the first half of the first intra period (e.g., prior to creation of chunk 3), then at step S58A the CDN 102 responds to the request by sequentially transmitting chunks beginning with the previous (and requested) IDR chunk 0 of the first HAS segment SEG-0. This is exemplified in scenario A shown in FIG. 2.

Returning to step S54A, if the CDN 102 determines that the request is not received within the first half of the first intra period (e.g., the request is received in the second half of the first intra period after creation of chunk 3, but prior to creation of the next IDR chunk 5), then at step S56A the CDN 102 waits for the next IDR chunk 5 of the first HAS segment SEG-0 to be created, and responds to the request by sequentially transmitting chunks to the HAS client 104A beginning with the next IDR chunk 5. This is exemplified in scenario B shown in FIG. 2.

The example embodiment shown in FIG. 5A may be applied across HAS segments SEG-0 and SEG-1 in which, for example, a second intra period extends from an IDR chunk 5 in the first HAS segment SEG-0 to the first IDR chunk 0 in the second HAS segment SEG-1. In this example, if the CDN 102 determines that the request is received within the a first half of the second intra period (e.g., after creation of IDR chunk 5, but before creation of chunk 7, of the first HAS segment SEG-0), then the CDN 102 responds to the request by sequentially transmitting chunks beginning with the previous IDR chunk 5 of the first HAS segment SEG-0. This is also exemplified in scenario A shown in FIG. 2.

If, however, the CDN 102 determines that the request is not received within the first half of the second intra period (e.g., the request is received after creation of chunk 7 of the first HAS segment SEG-0, then the CDN 102 waits for the IDR chunk 0 of the second HAS segment SEG-1, and responds to the request by sequentially transmitting chunks to the HAS client 104A beginning with the IDR chunk 0 of the second HAS segment SEG-1. This is exemplified in scenario C shown in FIG. 2.

Referring now to FIGS. 2 and 5B, at step S52B the CDN 102 receives an initial request (from the HAS client 104A) for chunk 0 for chunk 0 of the first HAS segment SEG-0 during creation of the first HAS segment SEG_0 at the HAS packager 100.

In response to receiving the request from the HAS client 104A, at step S54B the CDN 102 determines whether the request was received prior to creation of the first IDR chunk 0 of the first HAS segment SEG-0. If the CDN 102 determines that the request was received prior to creation of the first IDR chunk 0, then at step S56B the CDN 102 responds to the request by sequentially transmitting chunks beginning with the IDR chunk 0 of the first HAS segment SEG-0. This is again exemplified in scenario A shown in FIG. 2.

Returning to step S54B, if the CDN 102 determines that the request was received after creation of the first IDR chunk 0 of the first HAS segment SEG-0, then at step S58B the CDN 102 decides whether the request was received during the first intra period between the first IDR chunk 0 and the next IDR chunk 5 (e.g., after creation of IDR chunk 0, but before creation of IDR chunk 5) of the first HAS segment SEG-0.

If the CDN 102 decides that the request was received during the first intra period between the first IDR chunk 0 and the next IDR chunk 5 of the first HAS segment SEG-0, then at step S510B the CDN 102 responds to the request by sequentially transmitting chunks beginning with the next IDR chunk 5 of the first HAS segment SEG-0. This is again exemplified in scenario B shown in FIG. 2.

Returning to step S58B, if the CDN 102 determines that the request was not received during the first intra period (e.g., the chunk was received after creation of the second IDR chunk 5 of the first HAS segment SEG-0), then at step S512B the CDN 102 waits for the first IDR chunk 0 of the second HAS segment SEG-1, and responds to the request by sequentially transmitting chunks beginning with the first IDR chunk 0 of the second HAS segment SEG-1. This is again exemplified in scenario C shown in FIG. 2.

By utilizing one or more example embodiments discussed above with regard to FIGS. 2, 5A and 5B, both the delay and the playback start time may be reduced and maintained less than the half of a length of the intra period.

During the continuous delivery of a LiveTV stream, network errors and/or video processing at a media player (at the HAS client) may result in an accumulated and/or progressive delay with respect to the input signal at the HAS client. One or more example embodiments may address this delay issue at the CDN, when necessary, by skipping the provisioning of chunks to the client, such that the most recent information (rather than delayed information) is provided to the HAS client.

Figure 3:
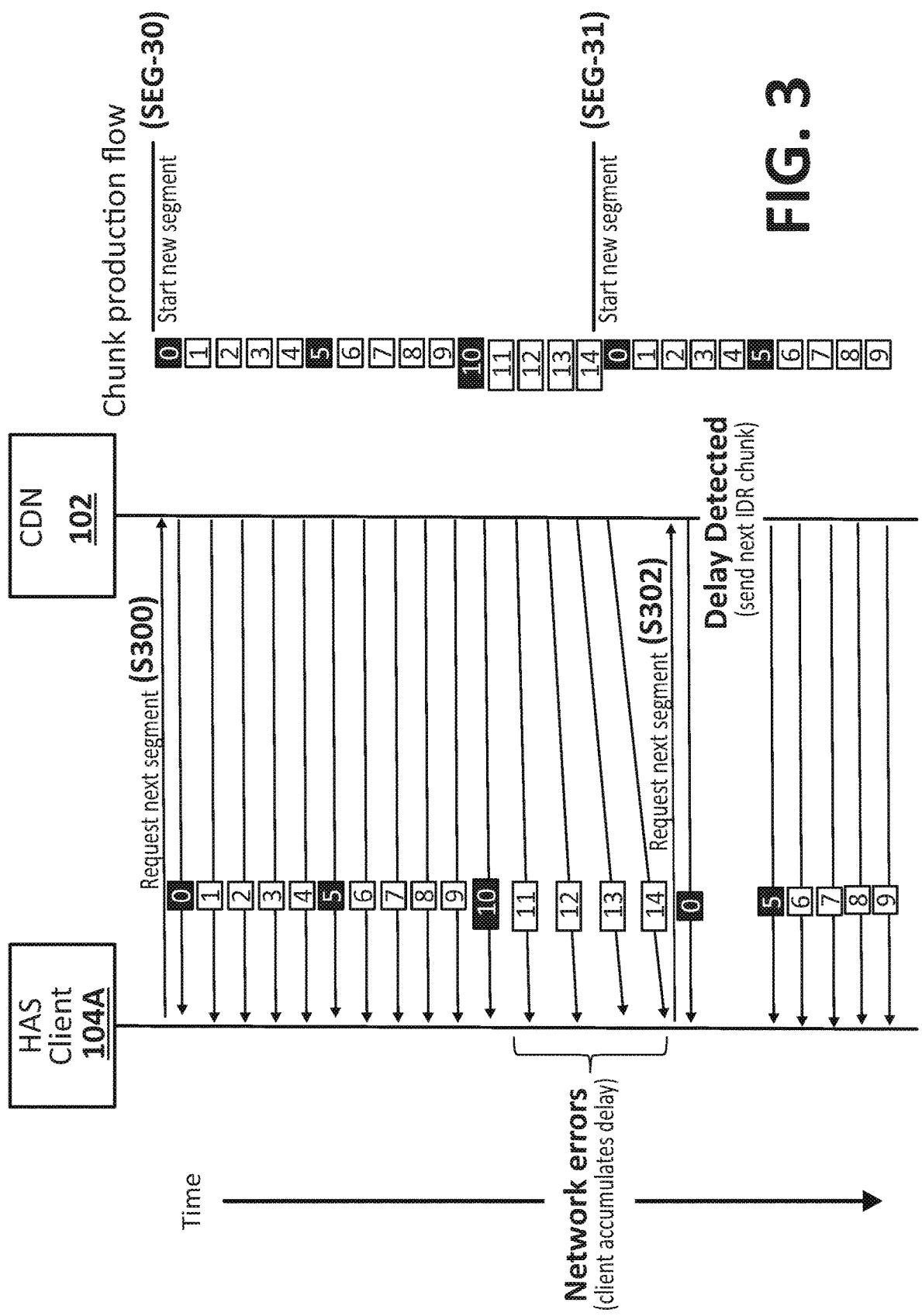
FIG. 3 is a signal flow diagram illustrating a method for delivering multimedia content according to an example embodiment.

FIG. 3 is a signal flow diagram illustrating an example embodiment of a method for delivering multimedia content to end users. The example embodiment shown in FIG. 3 may address accumulated and/or progressive delay at a HAS client when necessary.

In FIG. 3, the chunk production flow illustrates production of chunks in real-time. In this example, two HAS segments SEG-30 and SEG-31 are shown. The first HAS segment SEG-30 includes a total of 15 chunks (0 through 14), wherein chunks 0, 5 and 10 are IDR chunks, and the second segment SEG-31 includes 10 chunks (including chunks 0 through 9), wherein chunks 0 and 5 are IDR chunks.

In response to receiving a request for the first HAS segment SEG-30 from HAS client 104A (S300), the CDN 102 sequentially transmits chunks 0 through 14 in order beginning with the first IDR chunk 0.

As shown in FIG. 3, as the chunks of the first HAS segment SEG-30 are transmitted to the HAS client 104A, the HAS client 104A is unable to follow the pace of chunk creation and delivery from the CDN 102 (e.g., due to network errors) beginning essentially at chunk 11. As a result, the alignment between the creation of chunks in the chunk production flow and the playback of the corresponding chunks at the HAS client 104A beginning around chunk 11 of the first HAS segment SEG-30 is disrupted. That is, for example, the timing of playback of a given chunk at the HAS client 104A is delayed relative to the timing for playback expected by the CDN 102.

In the example shown in FIG. 3, when the HAS client 104A requests the next HAS segment SEG-31 from the CDN 102 (S302), the CDN 102 transmits the first IDR chunk 0 for the second HAS segment SEG-31, and then detects the delay based on the next chunk expected to be transmitted by the CDN 102 according to the chunk production flow. In this regard, if the next expected chunk to be transmitted is not chunk 1 of the second. HAS segment SEG-31, then the CDN 102 determines that the HAS client 104A is experiencing a delay. Although FIG. 3 illustrates transmission of the first IDR chunk 0 in response to the request from the HAS client 104A, and before detecting delay, this is optional. According to one or more other example embodiments, the CDN 102 may detect delay in response to the request without transmitting the first IDR chunk 0.

After having detected a delay, if necessary, the CDN 102 skips to transmission of the next IDR chunk (without transmitting the chunks between the first IDR chunk and the second IDR chunk) to reduce the delay and maintaining a relatively low lag performance. An example embodiment of a method performed at the CDN 102 in response to receiving; the request for segment SEG-31 (S302) and detecting a delay at the HAS client 104A will be described in more detail below with regard to FIG. 6.

Figure 6:
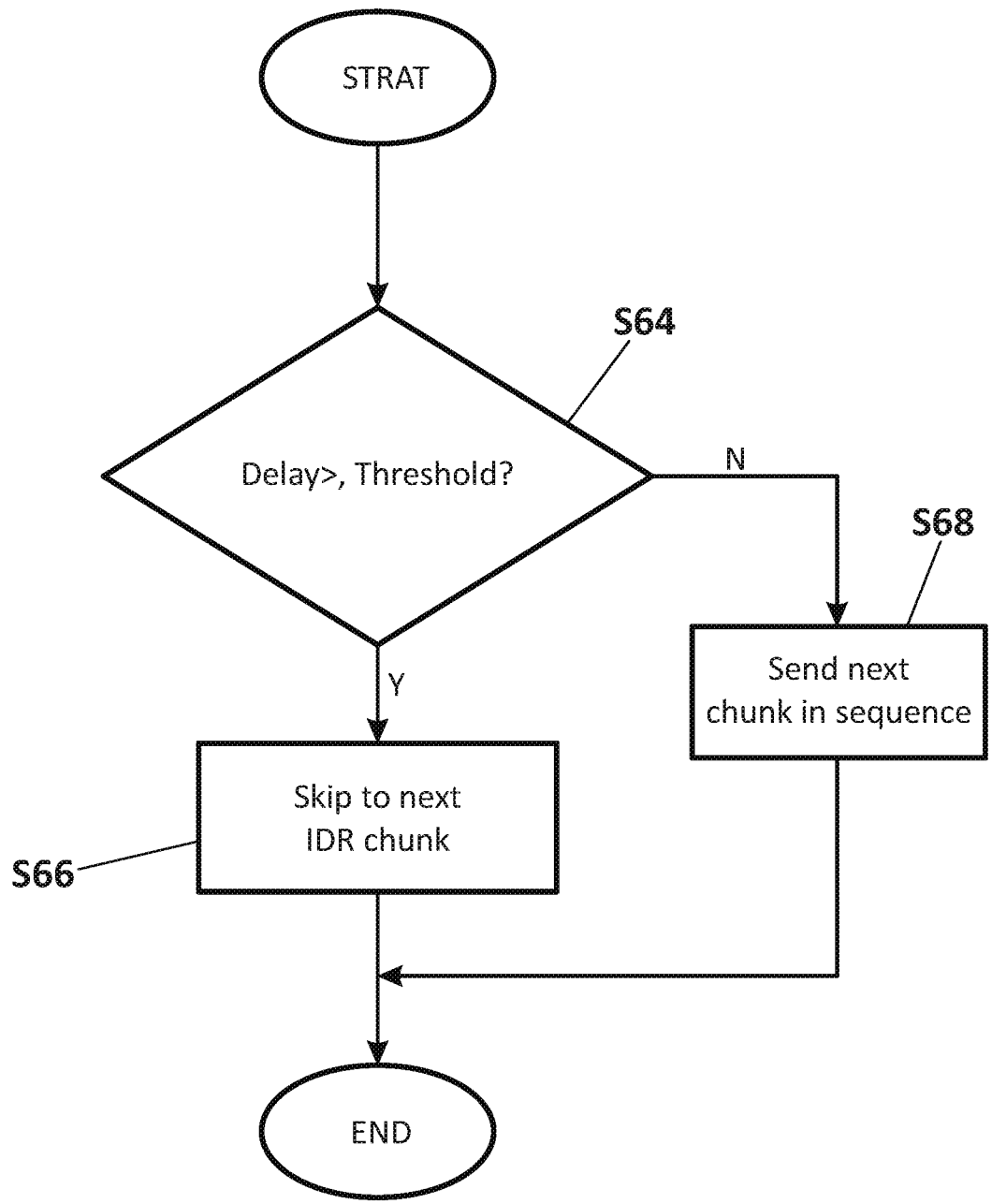
FIG. 6 is a flow chart illustrating yet another example embodiment of a method for delivering multimedia content to end users.

FIG. 6 is a flow chart illustrating an another example embodiment of a method for delivering multimedia content to end users to address accumulated and/or progressive delay at a HAS client.

Referring to FIGS. 3 and 6, in response to receiving the request for chunk 0 of the second HAS segment SEG-31 (S302) and transmitting IDR chunk 0 of the second HAS segment SEG-31, at step S64 the CDN 102 determines whether the accumulated delay at the HAS client 104A is greater than a threshold delay value (also referred to as a delay threshold). In one example, the delay may be tracked in number of chunks, and a threshold delay may be about 2 or 3 chunks. However, example embodiments should not be limited to this example.

If the CDN 102 determines that the accumulated delay is less than or equal to the threshold delay, then at step S68, the CDN 102 continues to sequentially transmit chunks 1 through 9 of the second HAS segment SEG-31 in order.

Returning to step S64, if the CDN 102 determines that the accumulated delay is greater than the threshold delay, then at step S66 the CDN 102 skips (e.g., directly) to transmitting the next IDR chunk 5 without transmitting chunks 1 through 4 between the consecutive IDR chunks 0 and 5 to reduce the detected delay.

By utilizing the example embodiments discussed above with regard to FIGS. 3 and 6, a HAS client may be provided with the most recent information and content.

Figure 4:
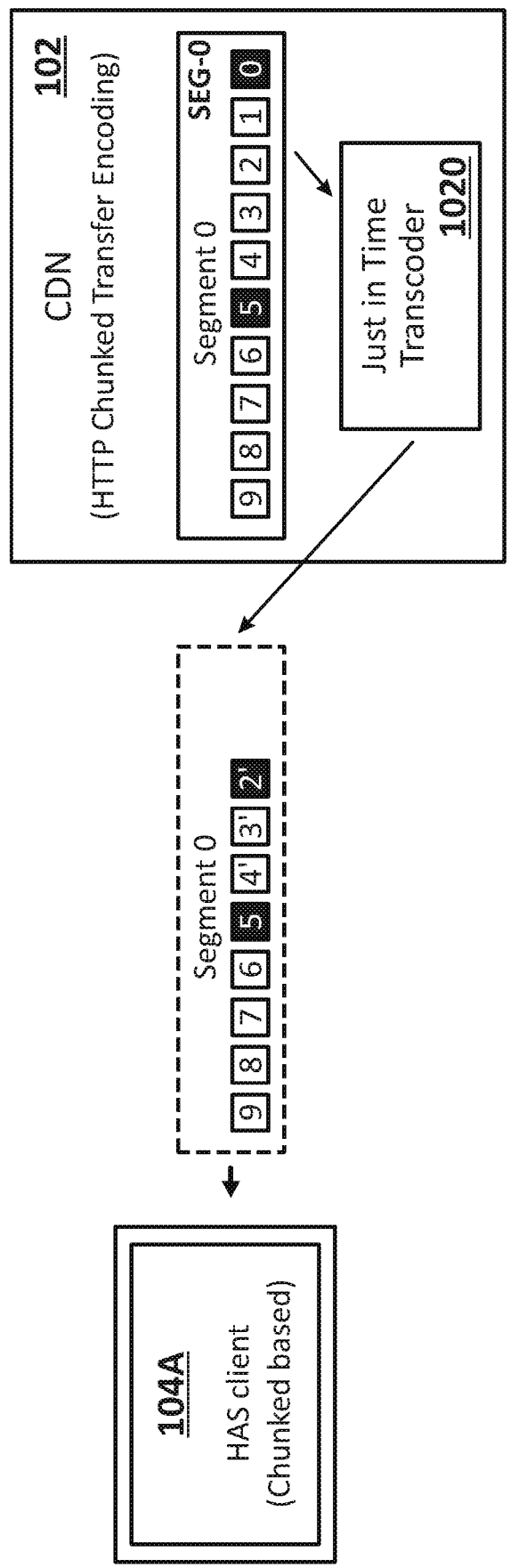
FIG. 4 is a block diagram illustrating a portion of another example embodiment of a system for delivering multimedia content to end users.

FIG. 4 is a block diagram illustrating a portion of another example embodiment of a system for delivering multimedia content to end users.

The portion of the system shown in FIG. 4 is similar to the portion of the system shown in FIG. 2, except that the CDN 102 includes a Just-in-Time transcoder 1020. The Just-in-Time transcoder 1020 may utilize any kind of Transcoding as a Service (TaaS) platform (also referred to as Just-in-Time transcoding (JITX)), which provides real time transcoding capabilities to the CDN or other systems in an End-2-End (E2E) multimedia content delivery chain. Because Just-in-Time transcoders and JITX are well-known, a detailed discussion is omitted.

Example functionality of the system including the CDN 102 and the JITT 1020 shown in FIG. 4 will be discussed in more detail below with regard to FIG. 7.

Figure 7:
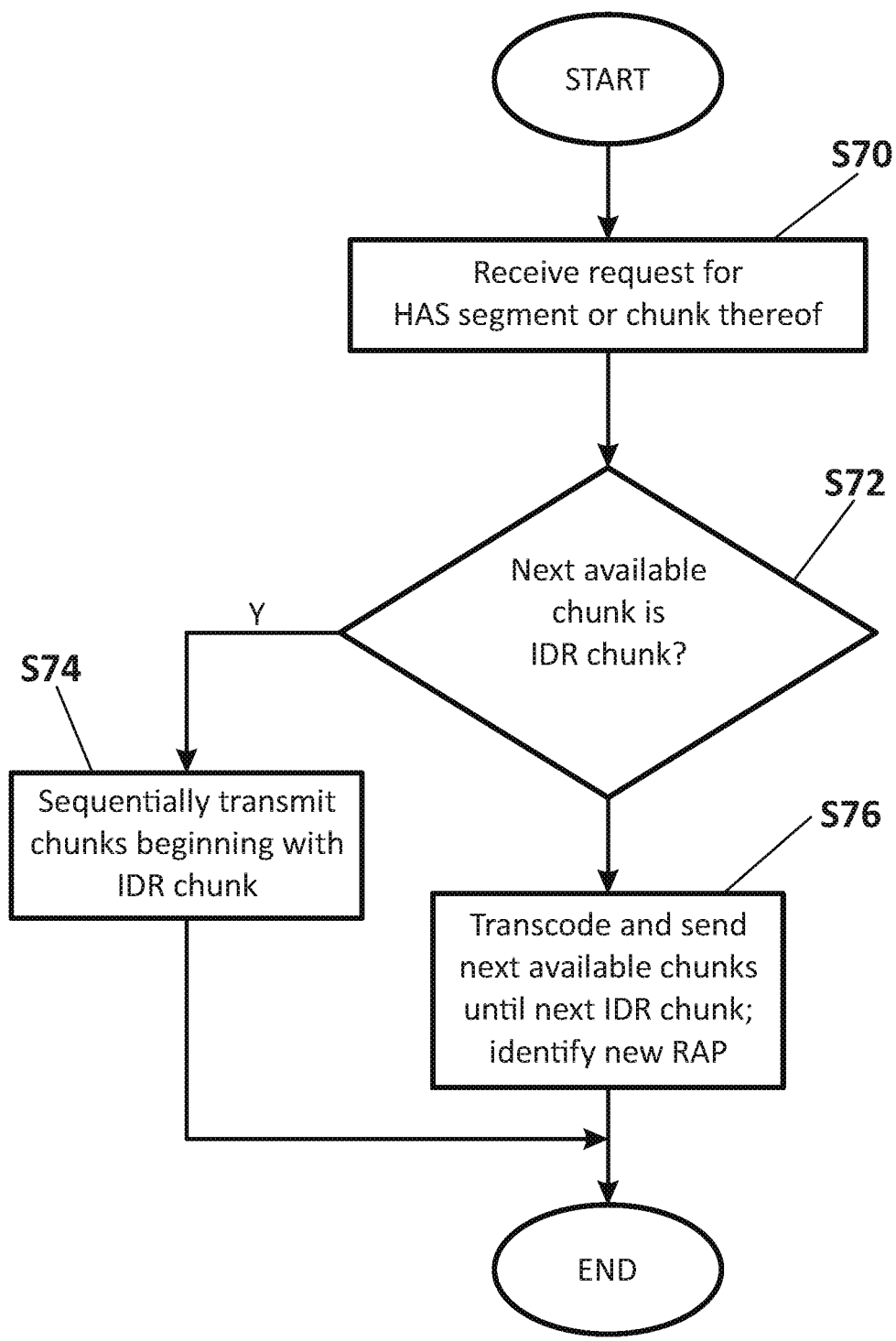
FIG. 7 is a flow chart illustrating still another example embodiment of a method for delivering multimedia content to end users.

FIG. 7 is a flow chart illustrating another example embodiment of a method for delivering multimedia content to end users. The example embodiment shown in FIG. 7 will be described with regard to delivery of HAS segment SEG-0 from the CDN 102 to the HAS client 104A in response to an initial request (from the HAS client 104A) for an IDR chunk 0 of the first HAS segment SEG-0. The HAS segment SEG-0 is the same as the HAS segment SEG-0 shown in FIG. 1.

Referring to FIG. 7, in response to receiving an initial request (from the HAS client 104A) for IDR chunk 0 of first HAS segment SEG-0 during creation of the first HAS segment SEG_0 at step S70, the CDN 102 determines whether the next available chunk in the first HAS segment SEG-0 is an IDR chunk at step S72.

If the next available chunk is an IDR chunk (e.g., IDR chunk 0 or 5), then at step S74 the CDN 102 sequentially transmits the chunks of the first HAS segment SEG-0 in order beginning with the IDR chunk. In one example, with regard to FIG. 4, if the request is received at the CDN 102 during creation of the IDR chunk 0, then the CDN 102 responds to the request by sequentially transmitting the chunks of the first HAS segment SEG-0 in order beginning with the IDR chunk 0.

Returning to step S72, if the next available chunk is not an IDR chunk (e.g., not IDR chunk 0 or 5), then at step S76 the CDN 102 transcodes (e.g., using JITX) and sequentially transmits (in order) each of the chunks in the first HAS segment SEG-0 until reaching the next IDR chunk. In so doing, the first of the chunks to be transmitted is transcoded to generate an IDR chunk. Along with creating a new IDR chunk, the CDN 102 identifies the transcoded. IDR chunk as a new Random Access Point (RAP) at which the player at the HAS client 104A is able to start to decode the received video content. As is known, a RAP indicates a starting point at which the HAS client is able to properly start decoding, for example, video in a video stream). According to one or more example embodiments discussed herein, the RAP may also indicate the existence, presence or position of an IDR frame (e.g., within a chunk). The CDN 102 may identify the new RAP in any well-known manner. Because methods for identifying RAPs are known, a detailed discussion is omitted.

In a more specific example, as shown in FIG. 4, if the request is received at the CDN 102 during creation of the chunk 2 of the HAS segment SEG-0, then the CDN 102 responds to the request by transcoding chunk 2 into a IDR chunk 2', transcoding chunks 3 and 4 to generate transcoded chunks 3' and 4', and sequentially transmits the transcoded chunks 2', 3' and 4' before continuing with transmission of the next IDR chunk 5. Along with creating a new IDR chunk 2', the CDN 102 identifies the transcoded IDR chunk 2' as a new RAP at which the player at the HAS client 104A is able to start to decode the received video content.

Figure 8:
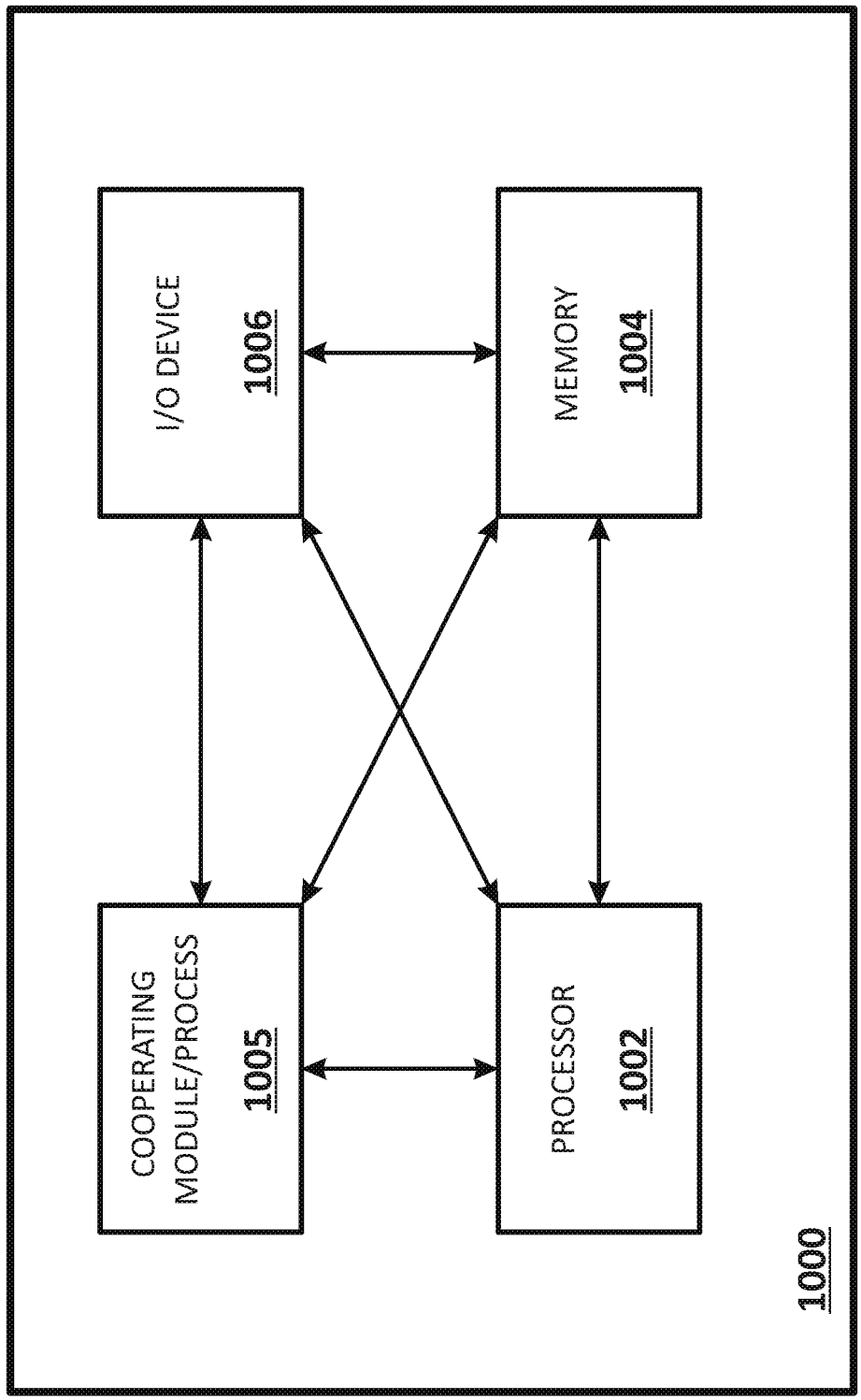
FIG. 8 provides a general architecture and functionality suitable for implementing functional elements described herein or portions of functional elements described herein.

FIG. 8 depicts a high-level block diagram of a computer or computing device suitable for use in implementing the HAS packager 100 and/or the CDN 102. Although not specifically described herein, the general architecture and functionality shown in FIG. 8 may also be suitable for implementing one or more of the HAS clients 104A and 104B.

Referring to FIG. 8, the computer 1000 includes one or more processors 1002 (e.g., a central processing unit (CPU) or other suitable processor(s)) and a memory 1004 (e.g., random access memory (RAM), read only memory (ROM), and the like). The computer 1000 also may include a cooperating module/process 1005. The cooperating process 1005 may be loaded into memory 1004 and executed by the processor 1002 to implement functions as discussed herein and, thus, cooperating process 1005 (including associated data structures) may be stored on a computer readable storage medium (e.g., RAM memory, magnetic or optical drive or diskette, or the like).

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

While one or more example embodiments will be described from the perspective of the CDN 102 (or other applicable device), it will be understood that one or more example embodiments discussed herein may be performed by the one or more processors (or processing circuitry) at the CDN 102 (or other applicable device).

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A content delivery server comprising:
a memory storing computer-readable instructions; and
one or more processors coupled to the memory, the one or more processors configured to execute the computer-readable instructions to cause the content delivery server to
receive a request for a HTTP adaptive bitrate streaming segment of a video stream, the HTTP adaptive bitrate streaming segment of the video stream including a series of chunks, each of the chunks including a set of video frames, a first of the chunks being a first Instantaneous Decoder Refresh chunk aligned with a first Instantaneous Decoder Refresh frame in the video stream, and a second of the chunks being a second Instantaneous Decoder Refresh chunk aligned with a second Instantaneous Decoder Refresh frame in the video stream, the second Instantaneous Decoder Refresh frame being subsequent to the first Instantaneous Decoder Refresh frame in the video stream,
determine whether the request was received during a first interval or a second interval of an intra period between creation of the first Instantaneous Decoder Refresh chunk and creation of the second Instantaneous Decoder Refresh chunk, the first interval prior to the second interval in the intra period, wherein whether the request was received during the first interval or the second interval of the intra period is determined based on a number of chunks between the first Instantaneous Decoder Refresh chunk and the second Instantaneous Decoder Refresh chunk in the series of chunks that have been created at the time of receipt of the request for the HTTP adaptive bitrate streaming segment,
output the first Instantaneous Decoder Refresh chunk in response to determining that the request was received during the first interval, and
output the second Instantaneous Decoder Refresh chunk in response to determining that the request was received during the second interval.

2. The content delivery server of claim 1, wherein
the first interval is a first half of the intra period; and
the second interval is a second half of the intra period.

3. A content delivery server, comprising:
a memory storing computer-readable instructions; and
one or more processors coupled to the memory, the one or more processors configured to execute the computer-readable instructions to cause the content delivery server to
receive a request for a HTTP adaptive bitrate streaming segment of a video stream, the HTTP adaptive bitrate streaming segment of the video stream including a series of chunks, each of the chunks including a set of video frames, a first of the chunks being a first Instantaneous Decoder Refresh chunk aligned with a first Instantaneous Decoder Refresh frame in the video stream, and a second of the chunks being a second Instantaneous Decoder Refresh chunk aligned with a second Instantaneous Decoder Refresh frame in the video stream, the second Instantaneous Decoder Refresh frame being subsequent to the first Instantaneous Decoder Refresh frame in the video stream, determine whether the request was received (i) prior to the creation of the first Instantaneous Decoder Refresh chunk or (ii) during an intra period between creation of the first Instantaneous Decoder Refresh chunk and creation of the second Instantaneous Decoder Refresh chunk,
output the first Instantaneous Decoder Refresh chunk in response to determining that the request was received prior to the creation of the first Instantaneous Decoder Refresh chunk,
output the second Instantaneous Decoder Refresh chunk for transmission in response to determining that the request was received during the intra period, and
output a third chunk of a subsequent HTTP adaptive bitrate streaming segment of the video stream for transmission in response to determining that the request was received after the creation of the second Instantaneous Decoder Refresh chunk, the third chunk being a third Instantaneous Decoder Refresh chunk aligned with a third Instantaneous Decoder Refresh frame in the video stream.

* * * * *